Sept. 1, 1970  J. H. PECHACEK  3,526,342
APPLICATOR APPARATUS ATTACHABLE TO
A WHEELED AGRICULTURAL IMPLEMENT
Filed July 10, 1968  2 Sheets-Sheet 2

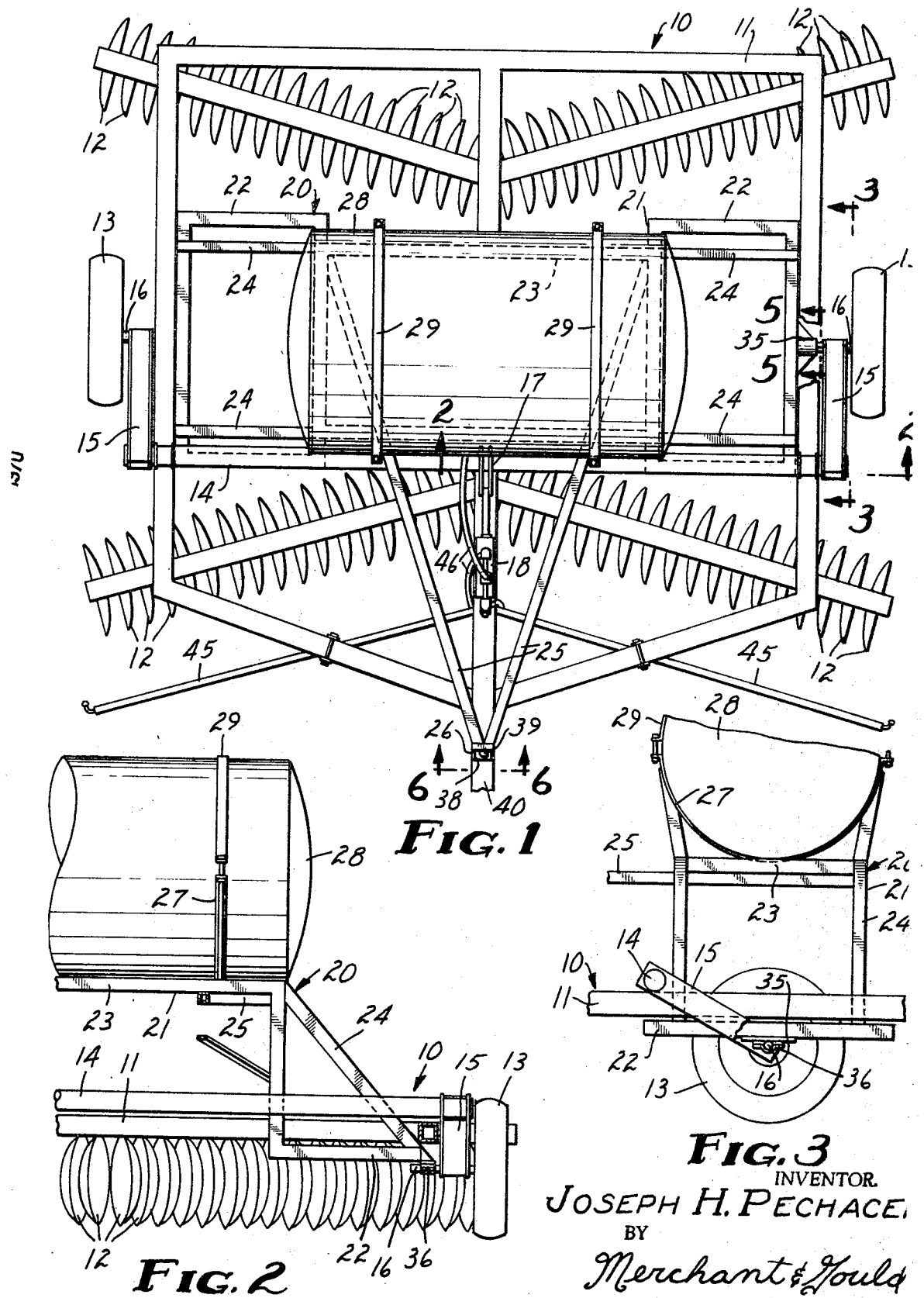

INVENTOR.
JOSEPH H. PECHACEK
BY
Merchant & Gould
ATTORNEYS

United States Patent Office 3,526,342
Patented Sept. 1, 1970

3,526,342
APPLICATOR APPARATUS ATTACHABLE TO A WHEELED AGRICULTURAL IMPLEMENT
Joseph H. Pechacek, Ulen, Minn. 56585
Filed July 10, 1968, Ser. No. 743,715
Int. Cl. A01c 15/00
U.S. Cl. 222—176                                           1 Claim

ABSTRACT OF THE DISCLOSURE

A frame having stub axles affixed thereto for suspending the frame on the wheels of an agricultural implement so that the frame extends above the instrument and supports a material container thereabove, for various tasks such as spraying weeds, fertilizing, etc., while adding very little, if any, weight to the frame of the agricultural implement.

BACKGROUND OF THE INVENTION

Field of the invention

During working of the soil for agricultural purposes it is often necessary to supply materials to the soil for various purposes, such as weed killer, fertilizers, etc. These materials may be applied to the soil while the soil is being worked, for example with a disc, cultivator, etc., to decrease the number of times the operator must travel over the soil and, in many instances, the material is most effective if applied during working of the soil.

Description of the prior art

In the prior art tanks and/or other receptacles are attached directly to the frame of an agricultural implement. This direct connection greatly increases the weight of the implement whereby operations such as raising and lowering the working parts of the implement are greatly complicated and stresses and strains on the implement are greatly increased. Further, as the material is used from the receptacle the weight on the frame of the implement varies and the operation, as well as the depth to which the implement works the soil, may change radically.

SUMMARY OF THE INVENTION

The present invention pertains to an applicator apparatus attachable to a wheeled agricultural implement by connecting means attached to the applicator frame and to the wheels of the agricultural implement for suspending the applicator apparatus relatively independent of the agricultural implement frame.

It is an object of the present invention to provide a new and improved applicator apparatus attachable to a wheeled agricultural implement.

It is a further object of the present invention to provide applicator apparatus which is attachable to a wheeled agricultural implement so as to add substantially no weight to the frame of the implement.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 1 is a view in top plan of the present invention mounted on an agricultural implement;

FIG. 2 is a sectional view as seen from the line 2—2 in FIG. 1;

FIG. 3 is a sectional view as seen from the line 3—3 in FIG. 1;

DESCRIPTION OF THE PREFERRED EMBODIMENT

Figure 4:
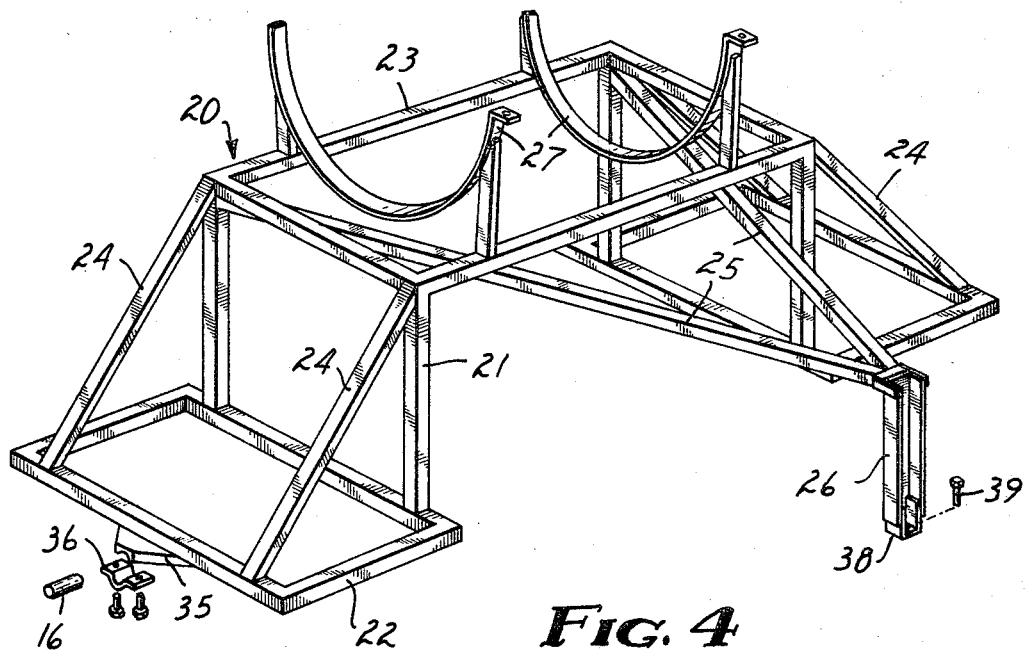
FIG. 4 is an exploded view in perspective of the applicator apparatus with the tank and distributing apparatus removed.
Figure 5:
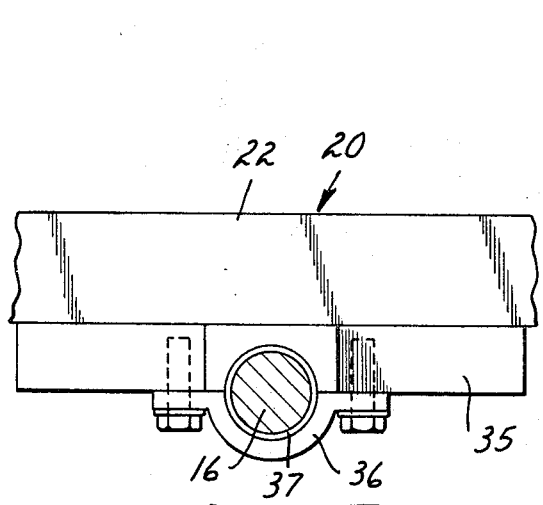
FIG. 5 is an enlarged sectional view as seen from the line 5—5 in FIG. 1.
Figure 6:
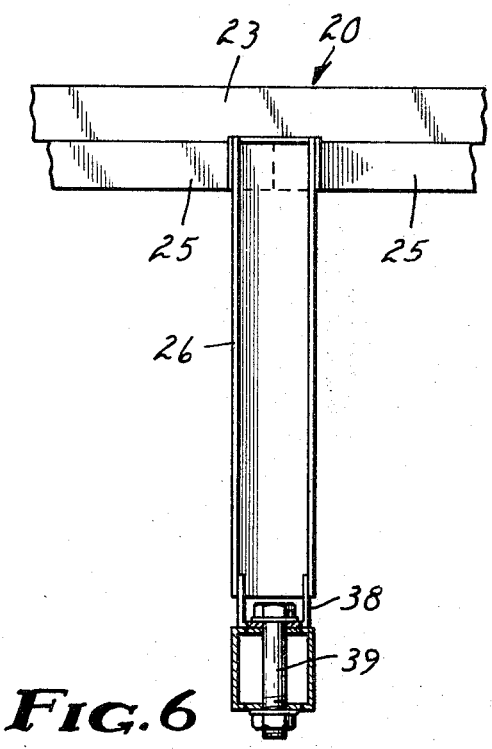
FIG. 6 is an enlarged sectional view as seen from the line 6—6 in FIG. 1.

In the figures the numeral 10 generally designates a disc cultivator having a frame 11 with a plurality of discs 12 attached thereto in the usual manner. The frame 11 is mounted on a pair of wheels 13 by means of a shaft 14 pivotally mounted on the cultivator frame 11 having a crank arm 15 fixedly attached to either end thereof with stub axles 16 mounting the wheels 13 at the extended ends of the crank arms 15. The shaft 14 is rotated by means of a centrally located lever 17 fixedly attached thereto for rotation therewith and a hydraulic cylinder 18 attached between the lever 17 and the cultivator frame 11 to rotate the shaft 14 upon actuation of the cylinder 18, and, consequently, vertically raise and lower the cultivator frame 11 relative to the wheels 13. It should be noted that the disc cultivator 10 described is a commercially available item and is described only for exemplary purposes. Many other types of agricultural implements might be utilized in conjunction with the present invention if desired.

Applicator apparatus generally designated 20 includes a frame 21 which may be formed in a variety of shapes. In the present embodiment the frame 21 has two rectangular shaped, generally horizontal side portions 22 with an elevated, generally horizontal center portion 23 mounted therebetween. A plurality of struts 24 extend between the outer edge of each of the side portions 22 and the adjacent outer edge of the central portion 23 to provide the frame 21 with sufficient rigidity. In addition, a pair of elongated generally horizontal braces 25 extend generally forwardly and convergently from beneath the central portion 23 to a connection with a generally vertical channel iron 26. The central portion 23 has a pair of cradles 27 fixedly attached thereto and a receptacle (also included in the applicator apparatus 20), which in this embodiment is a barrel 28, is mounted in the cradles 27. The barrel 28 is held in place by means of straps 29 which extend over the top of the barrel 28 and are fixedly attached to the ends of the cradles 27 by means of bolts or the like.

A plate 35 having a downwardly opening semi-cylindrical groove therein is affixed to the outer edge of each of the side portions 22 so that the semi-cylindrical grooves are approximately coaxial. Two second plates 36 having semi-cylindrical grooves therein are adapted to mate with the plates 35 to form a bearing block having a cylindrical opening therein for the insertion of an axle. The plates 36 are bolted to the plates 35, in the present embodiment, so that they are easily removable. The two stub axles 16 mounting the wheels 13 at the ends of the crank arms 15 extend through the crank arms 15 and inwardly toward each other a sufficient distance to be engaged between the plates 35 and 36 at either outer edge of the frame 21. A cylindrical bearing 37 is placed between each of the plates 35 and 36 and around the axle 16 so that the axle 16 rotates freely relative to the frame 21. Thus, the cultivator frame 11 can be raised and lowered, by means of the hydraulic cylinder 18, relative to the applicator frame 21 without affecting the position of the applicator frame 21.

The lower end of the channel iron 26 has a generally U-shaped portion 38 affixed thereto so that the bight of the U-shaped portion is generally horizontal and positioned slightly beyond the end of the channel iron 26. A bolt 39 extends through the bight of the U-shaped portion 38 and vertically through a draw bar 40 attached to the cultivator frame 11. The applicator frame 21 is maintained in the correct orientation by the braces 25 and the channel iron 26 connected to the draw bar 40.

In the present embodiment the barrel 28 is adapted to receive liquids, such as weed killers, liquid fertilizers, etc. Material distributing apparatus, such as a pair of tubular sprinklers 45 are attached to the cultivator frame 11 forward of the discs 12 so that the material distributed by the tubular sprinklers 45 is mixed with the soil. The barrel 28 communicates with the tubular sprinklers 45 through flexible conduits 46. It should be understood that different types of material distributing apparatus might be utilized if different material, such as powder or granular material, were utilized and the present barrel 28, flexible conduit 46 and tubular sprinklers 45 are illustrated only for exemplary purposes.

Thus, applicator apparatus is disclosed which is attachable to substantially any wheeled agricultural implement utilized for working the soil. The applicator apparatus is suspended directly from the wheels of the agricultural implement so that no additional weight is added to the implement frame. Since no additional weight is added to the implement frame by the applicator apparatus, the agricultural implement will operate in the normal manner. Further, since the applicator apparatus is independent of the implement frame, the implement frame may have a flotation movement or can be raised and lowered between operative and inoperative positions without affecting the applicator apparatus and no additional stress or strain will be applied to the implement frame or the operating parts thereof. In addition to the above the applicator apparatus is quickly removable from the agricultural implement when it is desired to utilize the implement separately.

What is claimed is:

1. Applicator apparatus attachable to a wheeled agricultural implement of the type having a main frame with a plurality of earth working devices attached thereto, the main frame being movably attached to a plurality of wheels for raising and lowering as a unit and attachable to a draft device, comprising:
   (a) an applicator frame;
   (b) means including stub axles affixed to said applicator frame and connecting said applicator frame to the wheels of the implement for supporting said applicator frame on the wheels independent of the implement main frame supported on the wheels, said connecting means allowing relative flotation between the main frame and said applicator frame;
   (c) material containing means affixed to and carried by said applicator frame; and
   (d) material distributing apparatus in communication with said containing means for receiving material from said containing means and distributing the material.

References Cited
UNITED STATES PATENTS

| | | | |
|---|---|---|---|
| 2,357,141 | 8/1944 | Singleton | 111—6 X |
| 3,396,983 | 8/1968 | Massey et al. | 239—172 X |
| 3,410,234 | 11/1968 | Peifer | 111—7 |

SAMUEL F. COLEMAN, Primary Examiner

H. S. LANE, Assistant Examiner

U.S. Cl. X.R.

111—6; 239—172